United States Patent
Nicq

(10) Patent No.: US 9,551,629 B2
(45) Date of Patent: Jan. 24, 2017

(54) SYSTEM FOR ACQUIRING A VIBRATORY SIGNAL OF A ROTARY MOTOR

(71) Applicant: SNECMA, Paris (FR)

(72) Inventor: Geoffroy Nicq, Thomery (FR)

(73) Assignee: SNECMA, Paris (FR)

( * ) Notice: Subject to any disclaimer, the term of this patent is extended or adjusted under 35 U.S.C. 154(b) by 286 days.

(21) Appl. No.: 14/371,195

(22) PCT Filed: Jan. 14, 2013

(86) PCT No.: PCT/FR2013/050083
§ 371 (c)(1),
(2) Date: Jul. 9, 2014

(87) PCT Pub. No.: WO2013/110878
PCT Pub. Date: Aug. 1, 2013

(65) Prior Publication Data
US 2014/0352444 A1  Dec. 4, 2014

(30) Foreign Application Priority Data

Jan. 24, 2012 (FR) ..................................... 12 50661

(51) Int. Cl.
*G01H 1/00* (2006.01)
*G01P 3/00* (2006.01)
*G01M 13/02* (2006.01)

(52) U.S. Cl.
CPC ........... *G01M 13/028* (2013.01); *G01H 1/003* (2013.01); *G01H 1/006* (2013.01); *G01P 3/00* (2013.01)

(58) Field of Classification Search
CPC ........... G01H 1/003; G01H 1/006; G01P 3/00; G01M 13/028

USPC .......................................................... 73/660
See application file for complete search history.

(56) References Cited

U.S. PATENT DOCUMENTS

| 4,697,128 A | * | 9/1987 | Matsushita | ........... F16C 32/048 |
|---|---|---|---|---|
| | | | | 310/90.5 |
| 5,471,880 A | | 12/1995 | Lang et al. | |
| 6,229,402 B1 | * | 5/2001 | Kataoka | ................. H02N 2/142 |
| | | | | 310/316.01 |
| 6,389,887 B1 | | 5/2002 | Dusserre-Telmon et al. | |
| 7,774,166 B2 | * | 8/2010 | Lindberg | ............... G01H 1/003 |
| | | | | 702/179 |

(Continued)

FOREIGN PATENT DOCUMENTS

FR   2 941 049           7/2010
WO   WO2010074645  *   7/2010

OTHER PUBLICATIONS

International Search Report Issued Jul. 10, 2013 in PCT/FR13/050083 filed Jan. 14, 2013.

*Primary Examiner* — J M Saint Surin
(74) *Attorney, Agent, or Firm* — Oblon, McClelland, Maier & Neustadt, L.L.P.

(57) ABSTRACT

A method and a system for acquiring a vibratory signal for troubleshooting a rotary motor, including: an input receiving a temporal vibratory signal of the motor and at least one current rotational speed of at least one shaft of the motor, and a sampling mechanism sampling the temporal vibratory signal in real time with at least one sampling signal synchronised with the at least one current rotational speed thus generating a corresponding synchronous vibratory signal.

9 Claims, 5 Drawing Sheets

(56) References Cited

U.S. PATENT DOCUMENTS

| | | | | |
|---|---|---|---|---|
| 7,925,392 B2* | 4/2011 | Altieri | ............... | B64C 29/005 |
| | | | | 701/3 |
| 8,843,348 B2* | 9/2014 | Pascu | ............... | G01M 13/028 |
| | | | | 701/100 |
| 9,032,803 B2* | 5/2015 | Griffaton | ............ | G01M 13/02 |
| | | | | 702/56 |
| 2009/0164142 A1 | 6/2009 | Studer et al. | | |
| 2011/0276247 A1 | 11/2011 | Carratt et al. | | |

* cited by examiner

SYSTEM FOR ACQUIRING A VIBRATORY SIGNAL OF A ROTARY MOTOR

FIELD OF THE INVENTION

The present invention relates to the field of acquiring vibratory signals of a motor and more particularly, acquiring vibratory signals for on-board motor troubleshooting.

STATE OF THE RELATED ART

A rotary motor is subject to mechanical stress liable to give rise to wear of the rotary elements thereof. One effective way of monitoring the wear or condition of a motor is that of measuring the motor vibrations.

More particularly, in the case of an aircraft motor, the latter comprises vibration sensors of the accelerometer type for detecting the vibrations emitted by the motor. The vibratory signals collected are then analysed to detect anomalies or defects of one or a plurality of rotary components. This analysis comprises a frequency analysis of the signals detected by the vibration sensors.

At the present time, vibratory analysis requires signal sampling operations at very high single constant frequency and signal oversampling operations at frequencies proportional to the harmonics to be analysed and the multiple harmonics thereof. Furthermore, it is necessary to apply very narrow tracking band-pass filters pre-programmed for each harmonic ratio and controlled by the motor rotational speed indicators.

The re-sampling operations essential for filtering harmonics require interpolations which are very costly in computing size and which need to be performed on a very large number of points. Furthermore, in order to ensure sufficient precision on the values of the interpolated filtered signals, it is important to perform very high-frequency acquisitions.

Finally, the interpolated signals are oversampled and involve performing Fourier transforms on a very large number of points. Moreover, the filtering operations require frequency analysis over the entire bandwidth of the signal, which is very costly in computing time.

In this way, the computing capacities of the on-board electronics are considerably monopolised by all these operations.

Consequently, the aim of the present invention is that of providing a system and a method for acquiring a vibratory signal in real time without involving the abovementioned drawbacks and in particular, using simplified computations requiring reduced electronic means.

DESCRIPTION OF THE INVENTION

The present invention is defined by a system for acquiring a vibratory signal for troubleshooting a rotary motor, comprising:

input means for receiving a temporal vibratory signal of said motor and at least one current rotational speed of at least one shaft of said motor, and sampling means for sampling of said temporal vibratory signal in real time with at least one sampling signal synchronised with said at least one current rotational speed thus generating a corresponding synchronous vibratory signal.

In this way, by directly sampling the vibratory signal at frequencies proportional to the rotation of the motor, this system makes it possible to minimise the computing time and the data storage volume. For example, in the case of an aircraft motor, the acquisition system may thus be advantageously used for on-board motor troubleshooting without monopolising the computing time or the memory space of an on-board computer.

Advantageously, said sampling signal is configured with a predefined maximum harmonic ratio and a predefined sampling ratio.

In this way, it is possible to predefine the maximum harmonics to be retrieved while simplifying the processing of the synchronous vibratory signal.

According to one specific feature of the present invention, the system comprises a buffer for buffering a sample consisting of a predefined number of periods of said synchronous vibratory signal, the temporal length of said buffer being determined according to a minimum harmonic ratio.

Selecting a reduced number of referenced points with respect to the rotation of the motor makes it possible to only occupy a reduced memory space while simplifying frequency signal retrieval.

Advantageously, the system comprises computing means for retrieving, from said buffered sample, frequency signals at multiple harmonics of the minimum harmonic and frequencies proportional to the corresponding current rotational speed.

This enables direct retrieval of the sought harmonics without using resampling or interpolation techniques.

Advantageously, the computing means are configured to retrieve said frequency signals by multiplying said buffered sample with Fourier coefficients of only the harmonics to be retrieved.

In this way, the use of Fourier coefficients on the entire analysis band is avoided.

According to one preferred embodiment of the present invention, the input means are configured to receive first and second current rotational speeds relative to first and second shafts of said motor respectively, and the sampling means are configured to directly generate first and second synchronous vibratory signals by sampling said temporal signal in real time with, respectively, a first sampling signal synchronised with said first current rotational speed, and a second sampling signal synchronised with said second current rotational speed.

This makes it possible in the case of an aircraft motor to reduce the on-board computing in the event of limited computing powers on an on-board computer on the motor or on the aircraft.

Advantageously, the sampling means are configured to directly generate a third synchronous vibratory signal by sampling said temporal vibratory signal in real time with a third sampling signal synchronised with the sum or the difference of said first and second current rotational speeds, said third sampling signal being reconstituted from a trigonometric combination of said first and second sampling signals.

In this way, a mere trigonometric computation is sufficient to directly generate a synchronous vibratory signal with the sum or the difference of the rotational speeds.

The system comprises first, second and third buffers for buffering respectively, a first sample consisting of a predefined number of periods of said first synchronous vibratory signal, a second sample consisting of a predefined number of periods of said second synchronous vibratory signal, and a third sample consisting of a predefined number of periods of said third synchronous vibratory signal, and in that the computing means are configured to respectively retrieve from said first, second and third buffered samples, first frequency signals at frequencies proportional to said first current rotational speed, second frequency signals at frequencies proportional to said second current rotational speed, and third frequency signals at frequencies proportional to said sum or difference of said first and second current rotational speeds.

The invention also relates to a system for monitoring a rotary motor, comprising the acquisition system according to any of the above features, and further comprising analysis means for analysing the frequency signal(s) in order to troubleshoot the status of the motor.

The invention also relates to a method for acquiring a vibratory signal for troubleshooting a rotary motor, comprising the following steps:

receiving a temporal vibratory signal from said motor and at least one current rotational speed N(t) of at least one shaft of said motor, and sampling said temporal vibratory signal in real time with at least one sampling signal synchronised with said at least one current rotational speed for generating a corresponding synchronous vibratory signal.

BRIEF DESCRIPTION OF THE FIGURES

Further features and advantages of the invention will emerge on reading preferential embodiments of the invention with reference to the attached figures wherein.

DETAILED DESCRIPTION OF PARTICULAR EMBODIMENTS

The underlying concept of the invention is based on the acquisition of vibration signals at frequencies directly synchronised with the rotational signals of the motor.

Figure 1:
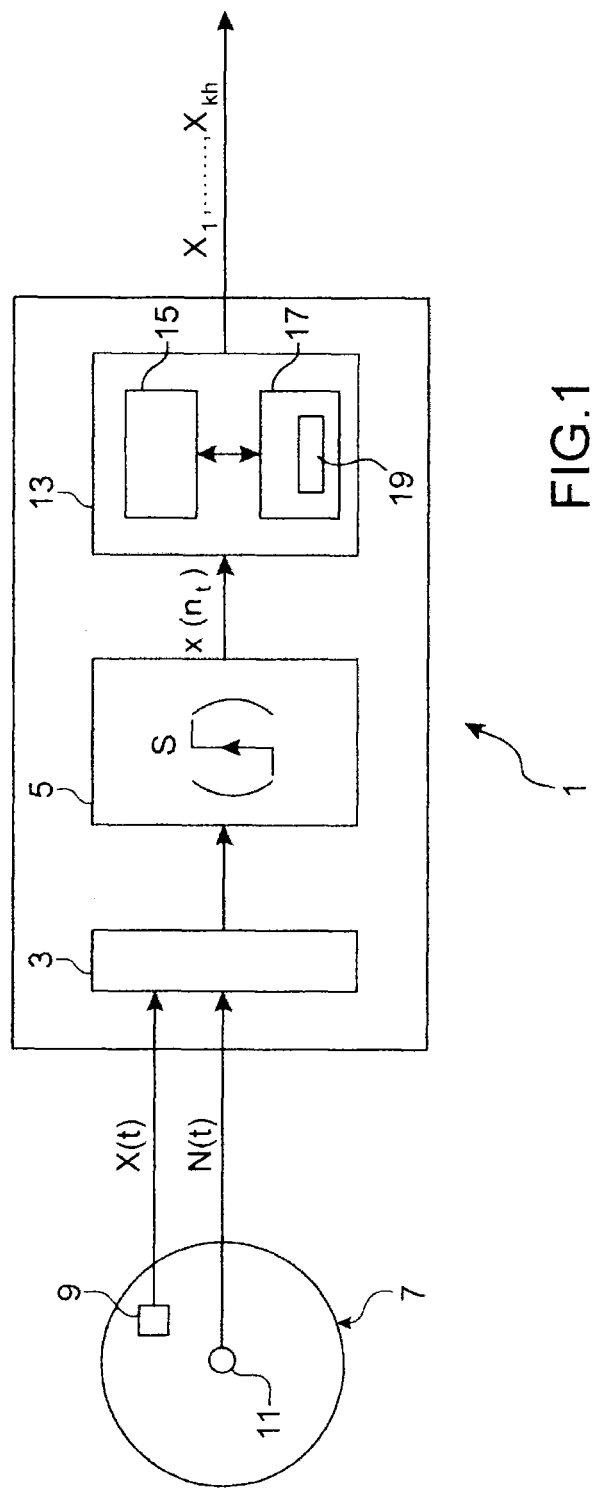
FIG. 1 schematically illustrates a system for acquiring a vibratory signal of a rotary motor, according to the invention.

FIG. 1 schematically illustrates a system for acquiring a vibratory signal of a rotary motor, according to the invention.

The acquisition system 1 comprises input means 3 and sampling means 5.

The input means 3 are configured to receive a temporal vibratory signal X(t) representing the operating status of the motor 7. The vibratory signal is obtained from at least one vibration sensor 9 of the accelerometer type installed on the motor 7.

Furthermore, the input means 3 are configured to receive at least one current rotational speed N(t) of at least one shaft 11 of the motor 7. It should be noted that the motor 7 may comprise two or more rotors comprising shafts rotating at different speeds.

The sampling means 5 are configured to sample the temporal vibratory signal X(t) in real time with a sampling signal synchronised with the current rotational speed N(t) thus generating a corresponding synchronous vibratory signal $x(n_r)$.

Figure 2A:
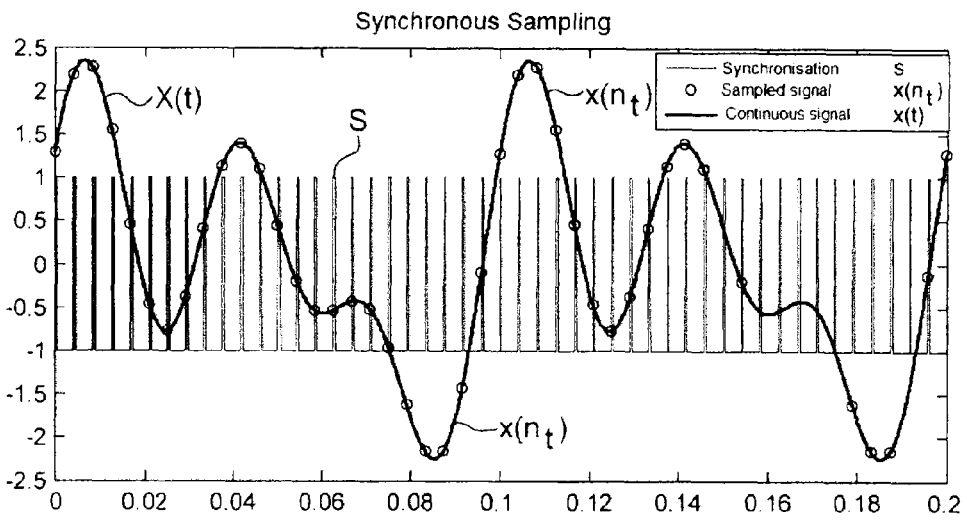
FIGS. 2A-2B illustrate an example of sampling of a temporal vibratory signal and retrieval of the frequency signals, according to the invention.

FIG. 2A illustrates an example of sampling of a temporal vibratory signal according to the invention.

The temporal vibratory signal X(t) is a continuous signal over time acquired for example at a frequency of the order of 250 kHz.

The sampling signal S is a square signal synchronised with the rotational speed N(t) of the motor 7. Furthermore, the sampling signal S is configured with a predefined maximum harmonic ratio kh and a predefined sampling ratio r. In this way, the sampling frequency S has a frequency $S_f = r \times N \times kh$. In other words, the sampling frequency varies in real time with the rotational speed of the motor 7 and is dependent on the maximum order kh of the harmonic to be retrieved and the minimum number of points per period sought (for example, 6 to 8 points). According to the example in FIG. 2A, the maximum harmonic is three (kh=3) and the sampling ratio is eight (r=8).

At each rising edge, the temporal vibratory signal X(t) is sampled to generate the synchronous vibratory signal $x(n_r)$. The signal $x(n_r)$ is then an undersampled discrete signal at a synchronous frequency with the rotational speed N(t) of the motor 7.

In this way, the temporal vibratory signal X(t) is directly converted into a digital signal $x(n_r)$ synchronised with the rotational speed N(t) of the motor.

Processing means 13 are then used to apply a Fourier transform to the synchronous vibratory signal $x(n_r)$ in order to retrieve frequency signals proportional to the rotational speed N(t) of the motor 7.

The processing means 13 may be comprised in the acquisition system 1 as illustrated in FIG. 1. Alternatively, they may be part of another electronic system (not shown) linked with the acquisition system 1.

The processing means 13 comprise computing means 15 and storage means 17 comprising at least one buffer 19. The storage means 17 may comprise a computer code program for the implementation of the acquisition method according to the invention.

Advantageously, the buffer 19 is configured to buffer a sample consisting of a predefined number of periods of the synchronous vibratory signal $x(n_r)$. The temporal length of the buffer 19 is determined according to a minimum harmonic ratio. The example in FIG. 2A illustrates a sample consisting of two periods of the synchronous vibratory signal $x(n_r)$ based on a minimum harmonic having a period equal to 0.1 s. This helps save memory space since the buffer 19 merely needs to store a very reduced number of points of the synchronous vibratory signal (for example, 8 points per harmonic).

Advantageously, the computing means 15 are configured to retrieve frequency signals $X_1, \ldots X_{kh}$ by multiplying the buffered sample point to point with Fourier coefficients of only the harmonics to be retrieved and not on the entire analysis band. These frequency signals $X_1, \ldots X_{kh}$ have multiple harmonics of the minimum harmonic and frequencies proportional to the corresponding rotational speed N(t) (see FIG. 2B).

Figure 2B:
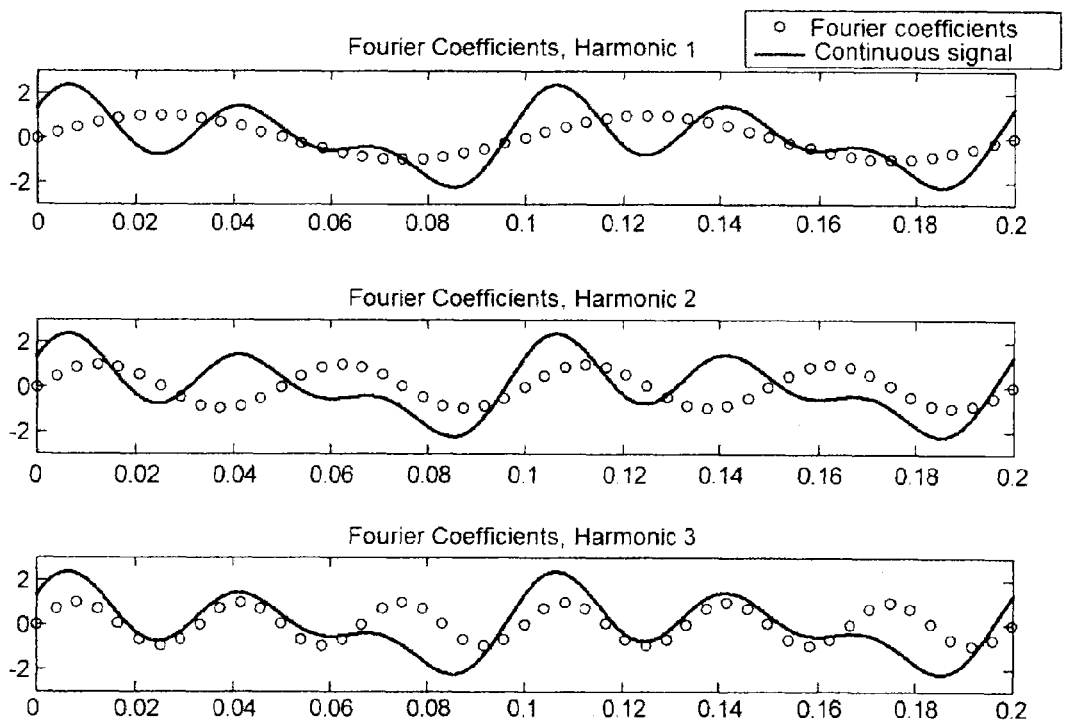

FIG. 2B illustrates an example of the real parts of the Fourier coefficients of harmonics 1, 2, and 3 applied to the buffered sample represented in FIG. 2A to retrieve three frequency signals $X_{11}, X_{12}$, and $X_{13}$ having the orders kh=1, kh=2 and kh=3 respectively. The imaginary parts (not shown) of the Fourier coefficients are subject to a phase shift of $\pi/2$.

In this way, the present invention makes it possible to retrieve the harmonic components directly at multiple frequencies of the rotation of the motor in a very reduced number of operations, without interpolations, and only storing a very reduced number of points in memory. This makes it possible to save considerable computing time and memory space.

It should be noted that the acquisition system and method apply to any type of rotary motor. In the case described hereinafter, the acquisition of a vibratory signal for the on-board troubleshooting of an aircraft motor will particularly be discussed.

Figure 3:
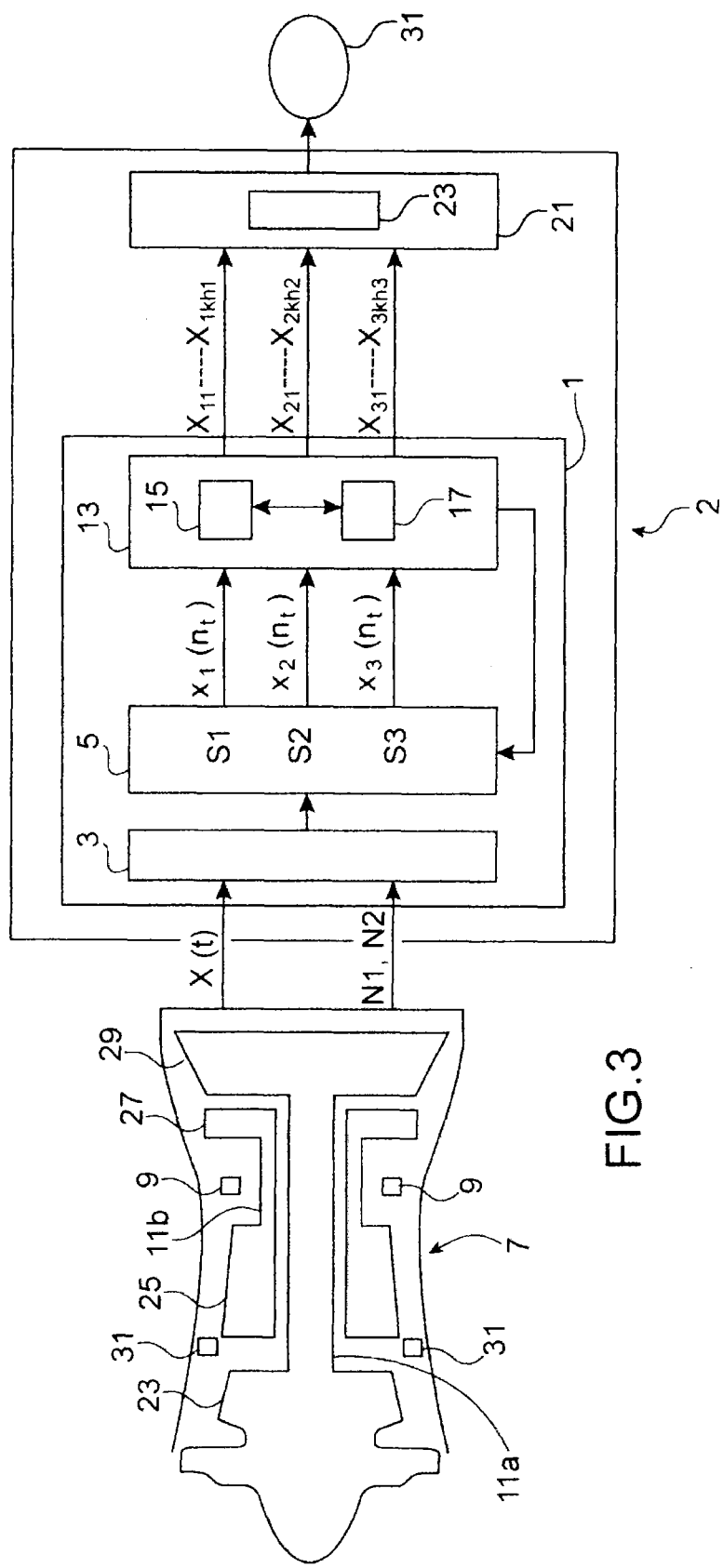
FIG. 3 illustrates a monitoring system for the on-board troubleshooting of the status of an aircraft motor, according to the invention.

FIG. 3 illustrates a monitoring system for the on-board troubleshooting of the status of an aircraft motor, according to the invention.

The monitoring system 2 comprises an acquisition system 1 and an anomaly detection system 21.

The aircraft motor 7 comprises a low-pressure compressor 23 upstream from a high-pressure compressor 25 and a high-pressure turbine 27 upstream from a low-pressure turbine 29. The low-pressure compressor 23 and turbine 29 are coupled by a first shaft 11a having a rotational speed $N_1$. Similarly, the high-pressure compressor 25 and the turbine 27 are coupled by a second shaft 11b having a rotational speed $N_2$. The second shaft 11b is a tube which is coaxial with the first shaft 11a and the two shafts are separated by an inter-shaft bearing (not shown). The two shafts 11a, 11b may be contra-rotating and the bearings then have a rotational speed $N_1+N_2$. Alternatively, the two shafts may be co-rotating and the inter-shaft bearings then have a rotational speed $N1-N2$.

Vibration sensors 9 of the accelerometer type are placed in the motor 7 for detecting the vibrations emitted thereby. Furthermore, the motor 7 comprises censors 31 for measuring the first and second rotational speeds $N_1$, $N_2$ of the first and second shafts 11a, 11b respectively.

In this way, to correctly diagnose the status of the motor 7 in operation, the present invention proposes to retrieve directly and in real time three groups of frequency signals respectively proportional to the rotational speeds $N_1$, $N_2$, and $N_1+N_2$ for detecting in real time any abnormal operation of any of the components of the motor 7.

Figure 4:
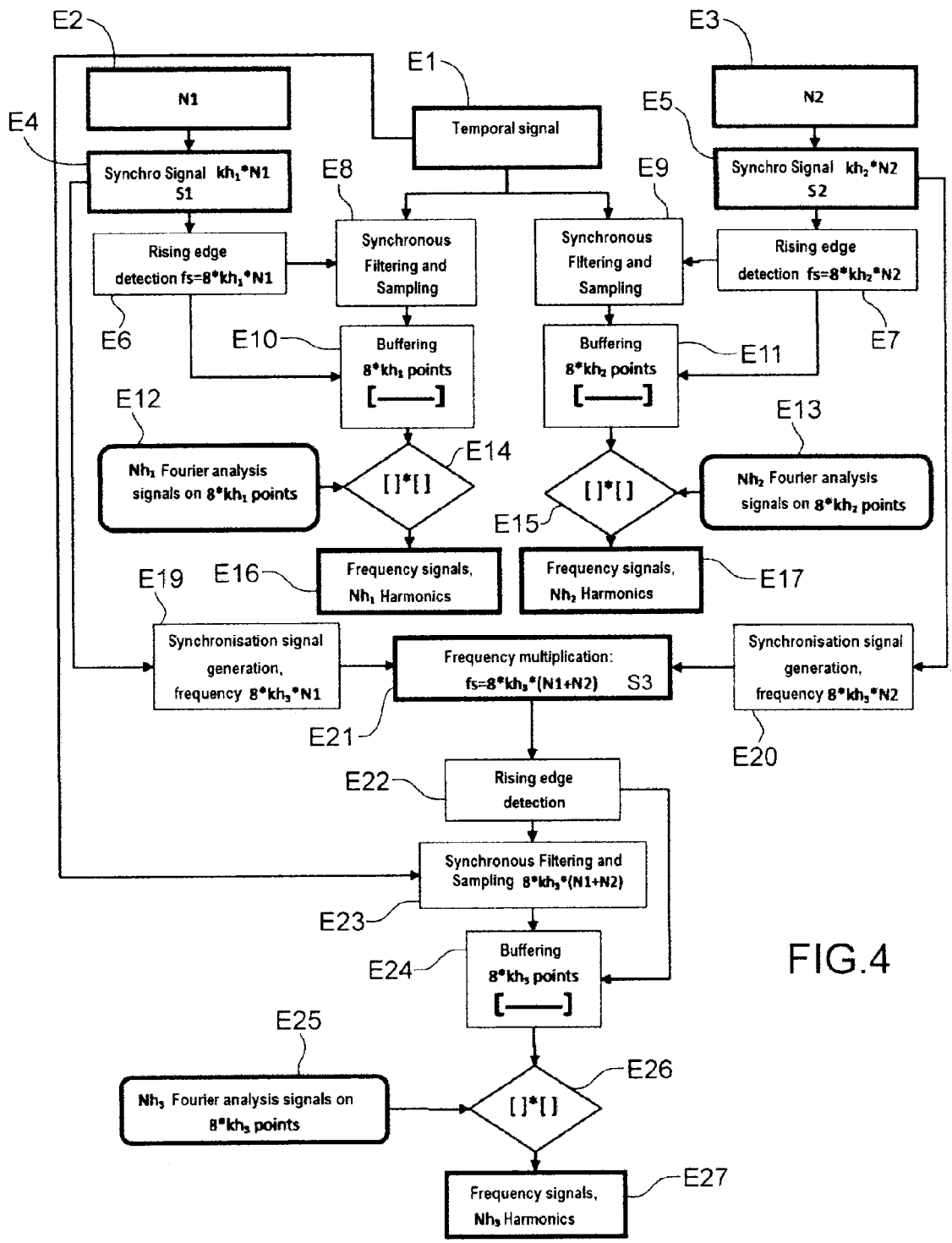
FIG. 4 illustrates an algorithm for acquiring and processing a vibratory signal of a motor, according to the invention.
Figure 5:
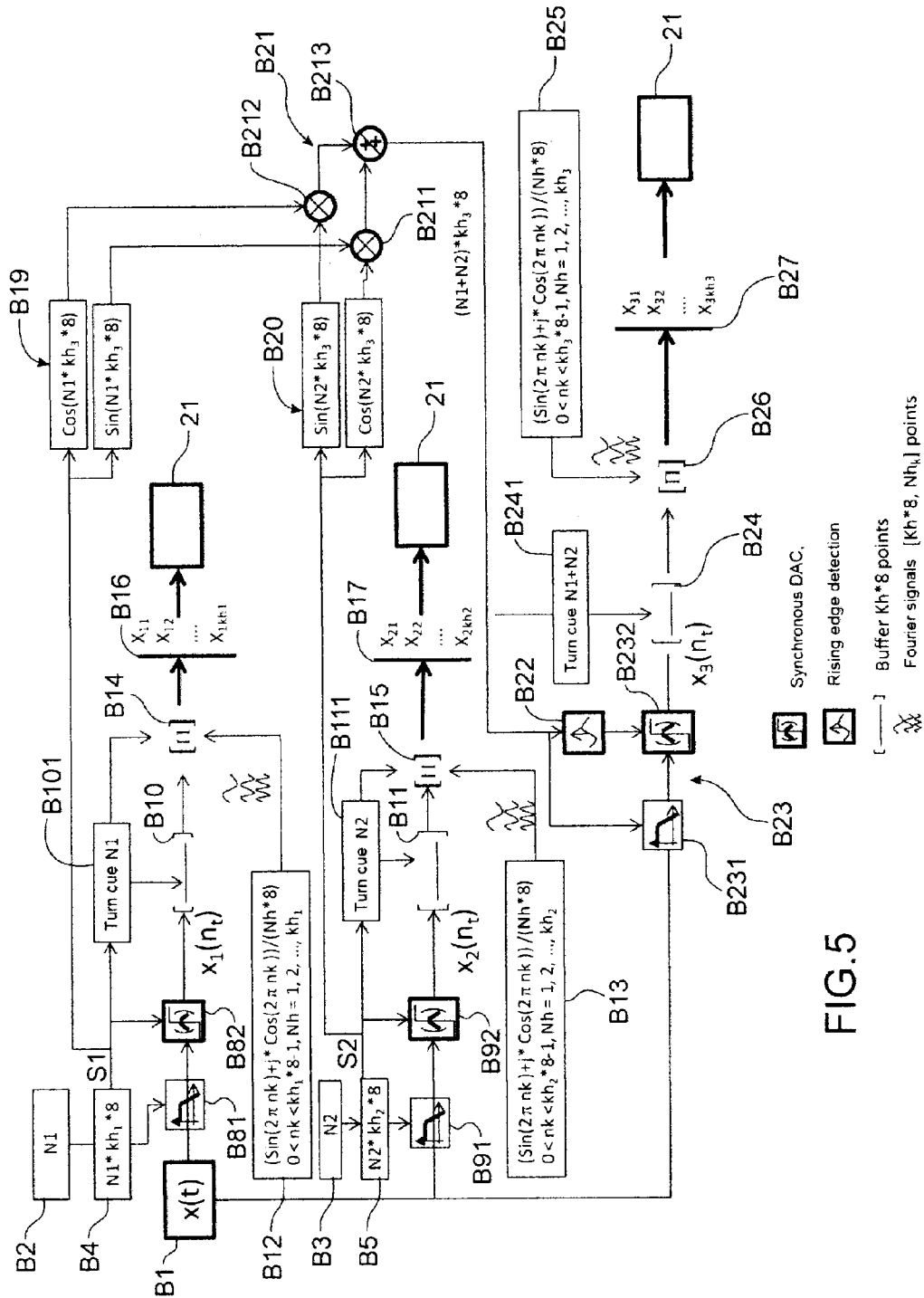
FIG. 5 illustrates a block diagram for acquiring and processing a vibratory signal of a motor, according to the invention.

FIGS. 4 and 5 illustrate, respectively, an algorithm and a block diagram for acquiring and processing a vibratory signal of a motor according to FIG. 3.

In steps E1-E3 (blocks B1-B3), the input means 3 receive, during a predefined period of operation of the motor 7, a temporal vibratory signal X(t) representing the operating status of the motor and the first and second current speed $N_1(t)$ and $N_2(t)$ relative, respectively, to the first and second shafts 11a, 11b of the motor 7.

The predefined period during which the temporal vibratory signal X(t) and the current speeds $N_1(t)$ and $N_2(t)$ are obtained may for example correspond to a particular flight phase or to a complete flight.

In steps E4-E9 (blocks B4-B9), the sampling means 5 are configured to directly generate first and second synchronous vibratory signals $x_1(n_r)$ and $x_2(n_r)$ by sampling in real time the temporal vibratory signal X(t) with, respectively, a first sampling signal S1 synchronised with the first current rotational speed $N_1(t)$, and a second sampling signal S2 synchronised with the second current rotational speed $N_2(t)$.

More particularly, in steps E4 and E5 (blocks B4 and B5), the first and second sampling signals are generated.

The first sampling signal S1 has a frequency defined according to the first speed $N_1$, having a predefined maximum harmonic ratio kh and a predefined sampling ratio r. By way of example, the frequency of the first sampling signal is $S_{f1}=8\times N_1\times kh_1$. The sampling ratio is in this case chosen to be equal to eight in order to facilitate the Fourier transform computations.

Similarly, the second sampling signal S2 is a signal wherein the frequency is defined according to the second speed $N_2$, having a predefined maximum harmonic ratio $kh_2$ and a predefined sampling ratio r. By way of example, the frequency of the second sampling signal is $S_{f2}=8\times N_2\times kh_2$.

In steps E6 and E7, the rising edges of the first and second sampling signals S1, S2 are detected in order to form square signals to sample the temporal vibratory signal X(t).

In step E8 (blocks B81, B82), the temporal signal X(t) is first filtered using a first low-pass filter B81 wherein the cut-off frequency is dependent on the maximum frequency of the harmonic $kh_1$ to be retrieved. Alternatively, the first low-pass filter B81 is controlled by the first sampling signal S1 wherein the instantaneous frequency is proportional to the first rotational speed N1 ($t$). Filtering the vibratory signal X(t) upstream from the sampling makes it possible to prevent any risk of spectral aliasing.

The vibratory signal X(t) filtered above is then sampled by a first asynchronous DAC analogue-digital converter B82 according to each rising edge of the first sampling signal to generate a first synchronous vibratory signal $x_1(n_r)$.

Similarly, in step E9 (blocks B91, B92), the temporary signal X(t) is filtered using a second low-pass filter B92 wherein the cut-off frequency is dependent on the maximum frequency of the harmonic $kh_2$ to be retrieved, or is controlled by the second sampling signal S2 wherein the instantaneous frequency is proportional to the second rotational speed N2 ($t$). The filtered vibratory signal X(t) is then sampled by a second asynchronous DAC B92 according to the second sampling signal S2 to generate a second synchronous vibratory signal $x_2(n_r)$.

The signals $x_1(n_r)$ $x_2(n_r)$ are discrete signals respectively synchronised with the rotational speeds $N_1$ and $N_2$.

In step E10 (blocks B10), a first sample consisting of a predefined number of periods of the first synchronous vibratory signal $x_1(n_r)$ is buffered in a first buffer B10 wherein the temporal length is determined according to the minimum harmonic ratio $h_1$.

Similarly, in step E11 (blocks B11), a second sample consisting of a predefined number of periods of the second synchronous vibratory signal $x_2(n_r)$ is buffered in a second buffer B11 wherein the temporal length is determined according to the minimum harmonic ratio $h_2$.

The first and second buffers B10, B11 are respectively activated at each turn cue of the rotations N1 and N2 (blocks B101, B111). Indeed, the downstream Fourier transform computations are performed at submultiple frequencies of the buffer refresh rate. The execution frequencies of these computations are synchronised at the rotational speeds of the motor shafts.

In steps E12-E17 (block B12-B17), the computing means will retrieve first and second groups of frequency signals $X_{11}, \ldots X_{1kh1}$ and $X_{21}, \ldots X_{2kh2}$.

More particularly, in step E12 (block B12), the computing means 15 generate first Fourier coefficients of only the harmonics to be retrieved in respect of the first rotational speed $N_1$: $(\sin(2\pi nk)+j\cos(2\pi nk))/8\times Nh$, the increment of the Fourier analysis nk verifying $0<nk<kh_1\times8-1$; Nh is the number of the harmonic computed where Nh=1,2, ..., $kh_1$ and $kh_1$ is the maximum order of the harmonic to be analysed for the rotational speed $N_1$.

In step E13 (block B13) the computing means 15 generate second Fourier coefficients of only the harmonics to be retrieved in respect of the second rotational speed $N_2$:

$(\sin(2\pi nk)+j\cos(2\pi nk))/8 \times Nh$, the increment of the Fourier analysis nk verifying $0<nk<kh_2 \times 8-1$; Nh is the number of the harmonic computed where Nh=1,2, ..., $kh_2$ and $kh_2$ is the maximum order of the harmonic to be analysed for the rotational speed $N_2$.

In step E14 (block B14), the first Fourier coefficients are multiplied in a matrix with the first sample of the first synchronous vibratory signal $x_1(n_t)$ to generate the first group of frequency signals $X_{11}, \ldots X_{1kh1}$ (E16, B16).

In step E15 (block B15), the second Fourier coefficients are multiplied in a matrix with the second sample of the second synchronous vibratory signal $x_2(n_t)$ to generate the second group of frequency signals $X_{21}, \ldots X_{2kh2}$ (E17 B17).

In steps E19-E27 (blocks B19-B27), the sampling means 5 are further configured to directly generate a third synchronous vibratory signal $x_3(n_t)$ by sampling the temporal vibratory signal X(t) in real time with a third sampling signal S3 synchronised with the sum $N_1+N_2$ of the first and second current rotational speed.

In steps E19-E21, the third sampling signal S3 is reconstituted by the processing means 13 from a trigonometric combination of the first and second sampling signals S1, S2.

Indeed, in step E19 (block B19), a first intermediate synchronisation signal is generated, wherein the frequency is defined according to the first speed $N_1$ and a predefined maximum harmonic ratio $kh_3$. In particular, from the first sampling signal (step E4, block B4), a sinusoidal sine signal and a sinusoidal cosine signal having the frequency $N1*kh_3*8$: $\sin(8 \times N_1 \times kh_3)$ and $\cos(8 \times N_1 \times kh_3)$ are generated.

Similarly, in step E20 (block B20), a second intermediate synchronisation signal is generated, wherein the frequency is defined according to the second speed $N_2$ and a predefined maximum harmonic ratio $kh_3$. In particular, from the second sampling signal (step E5, bloc B5), a sinusoidal sine signal and a sinusoidal cosine signal having the frequency $N2*kh_3*8$: $\sin(8 \times N_2 \times kh_3)$ and $\cos(8 \times N_2 \times kh_3)$ are generated.

In step E21, multiplication is performed (B211, B212) of $\sin(8 \times N_1 \times kh_3)$ from step E19 with $\cos(8 \times N_2 \times kh_3)$ from step E20 and $\cos(8 \times N_1 \times kh_3)$ from step E19 with $\sin(8 \times N_2 \times kh_3)$ from step E20 to respectively form the signals $\sin(8 \times N_1 \times kh_3) \times \cos(8 \times N_2 \times kh_3)$ and $\cos(8 \times N_1 \times kh_3) \times \sin(8 \times N_2 \times kh_3)$. In block B213, these latter two signals are added to form a signal having the format $\sin(8 \times kh_3 \times (N_1+N_2))$. On the basis of this signal, a third sampling signal S3 is determined wherein the frequency is defined according to the sum of the first speed $N_1$ and the second speed $N_2$ and a predefined maximum harmonic ratio $kh_3$ and a predefined sampling ratio r (in this instance r=8).

It should be noted that if the first and second shafts of the motor 11a, 11b are co-rotating, it is sufficient to replace the addition of block B213 by a subtraction to generate a sampling signal wherein the frequency is defined according to the difference between the first speed $N_1$ and the second speed $N_2$.

In step E22 (block B22), the rising edges of this sampling signal are retrieved to form a square signal for sampling the temporal signal X(t).

Indeed, in step E23 (blocks B231, B232), the temporal vibratory signal X(t) is first filtered using a third low-pass filter B231 wherein the cut-off frequency is dependent on the maximum frequency of the harmonic $kh_3$ to be retrieved. Alternatively, the third low-pass filter B231 is controlled by the third sampling signal S3. The filtered vibratory signal X(t) is then sampled by a third asynchronous DAC B232 according to the third sampling signal S3 to generate a third synchronous vibratory signal $x_3(n_t)$. In this way, the signal $x_3(n_t)$ is a discrete signal synchronised with the rotational speed $N_1+N_2$.

In step E24 (blocks B24), a third sample consisting of a predefined number of periods of the third synchronous vibratory signal $x_3(n_t)$ is buffered in a third buffer B24 wherein the temporal length is determined according to the minimum harmonic ratio $h_3$. The third buffer B24 is activated at each turn cue of the rotation N1 +N2 (block B241).

In step E25 (block B25), the computing means 13 generate third Fourier coefficients of only the harmonics to be retrieved in respect of the rotational speed $N_1+N_2$: $(\sin(2\pi nk)+j\cos(2\pi nk))/8 \times Nh$, the increment of the Fourier analysis nk verifying $0<nk<kh_3 \times 8-1$; Nh is the number of the harmonic computed where Nh=1, 2, ..., $kh_3$ and $kh_3$ is the maximum order of the harmonic to be analysed for the rotational speed $N_1+N_2$.

In step E26 (block B26), the third Fourier coefficients are multiplied in a matrix with the third sample of the third synchronous vibratory signal $x_3(n_t)$ to generate a third group of frequency signals $X_{31}, \ldots X_{3kh3}$ (E27, B27).

The system or method according to the invention does not use under or oversampling operations, and uses FFT simplified Fourier transform computations. Indeed, only the signals with the relevant harmonics are retrieved for the troubleshooting of the motor with minimum computing and memory. Furthermore, tracking filters are not used.

In this way, the required performance of the on-board memory (RAM memory, computing speed) is reduced. Furthermore, the overheating induced is reduced and the operating ranges are increased.

Moreover, the first, second and third groups of frequency signals are suitable for respectively troubleshooting the first shaft, the second shaft and the inter-shaft bearings of the motor.

Indeed, the detection system 21 (see FIG. 3) retrieves the first, second and third groups of frequency signals in real time to analyse same. The detection system 21 comprises analysis means 23 for, for example, correlating the frequency signals with other signals or for comparing same to predefined threshold values to monitor the status of the motor 7 in real time. The detection system may, for example, monitor the progression in amplitude of the various harmonics of the frequency signals with respect to corresponding relative thresholds. A threshold overshoot may thus activate alarms or warning messages 31.

Alternatively, the analysis of the frequency signals may be carried out offline so as to minimise the computing time further during the flight.

Advantageously, the first, second and third groups of frequency signals may be stored from flight to flight in a database for analysing the progression of the status of the motor 7 over time.

It should be noted that the monitoring system may be integrated in a specific unit or be part of an existing electronic unit. Advantageously, the acquisition and processing means of an on-board computer in the aircraft or in a computer integrated in the aircraft motor of the EMU (Engine Monitoring Unit) type may be used to operate the system for acquiring vibratory signals and troubleshooting the motor according to the invention.

The invention claimed is:

1. A system for acquiring a vibratory signal for troubleshooting a rotary motor, comprising:
   input means for receiving a temporal vibratory signal of said motor and at least one current rotational speed of at least one shaft of said motor; and sampling means for sampling of said temporal vibratory signal in real time with at least one sampling signal synchronised with said at least one current rotational speed thus generating a corresponding synchronous vibratory signal, said sampling signal being configured with a predefined maximum harmonic ratio and a predefined sampling ratio.

2. A system according to claim 1, further comprising a buffer for buffering a sample of a predefined number of periods of said synchronous vibratory signal, a temporal length of said buffer being determined according to a minimum harmonic ratio.

3. A system according to claim 2, further comprising computing means for retrieving, from said buffered sample, frequency signals at multiple harmonics of the minimum harmonic and frequencies proportional to the corresponding current rotational speed.

4. A system according to claim 3, wherein the computing means is configured to retrieve said frequency signals by multiplying said buffered sample with Fourier coefficients of only the harmonics to be retrieved.

5. A system for monitoring a rotary motor, comprising:
the system according to claim 3; and
analysis means for analysing the frequency signal(s) in order to troubleshoot a status of the motor.

6. A system according to claim 1, wherein:
the input means is configured to receive first and second current rotational speeds relative to first and second shafts of said motor respectively, and
the sampling means is configured to directly generate first and second synchronous vibratory signals by sampling said temporal signal in real time with, respectively, a first sampling signal synchronised with said first current rotational speed, and a second sampling signal synchronised with said second current rotational speed.

7. A system according to claim 6, wherein the sampling means is configured to directly generate a third synchronous vibratory signal by sampling said temporal vibratory signal in real time with a third sampling signal synchronised with the sum or the difference of said first and second current rotational speeds, said third sampling signal being reconstituted from a trigonometric combination of said first and second sampling signals.

8. A system according to claim 7, further comprising first, second, and third buffers for buffering respectively, a first sample of a predefined number of periods of said first synchronous vibratory signal, a second sample of a predefined number of periods of said second synchronous vibratory signal, and a third sample of a predefined number of periods of said third synchronous vibratory signal, and
wherein the computing means is configured to respectively retrieve from said first, second, and third buffered samples, first frequency signals at frequencies proportional to said first current rotational speed, second frequency signals at frequencies proportional to said second current rotational speed, and third frequency signals at frequencies proportional to said sum or difference of said first and second current rotational speeds.

9. A method for acquiring a vibratory signal for troubleshooting a rotary motor, comprising:
receiving a temporal vibratory signal from said motor and at least one current rotational speed of at least one shaft of said motor; and
sampling said temporal vibratory signal in real time with at least one sampling signal synchronised with said at least one current rotational speed for generating a corresponding synchronous vibratory signal, said sampling signal being configured by a predefined maximum harmonic ratio and a predefined sampling ratio.

* * * * *